United States Patent [19]
Yokota

[11] Patent Number: 5,819,127
[45] Date of Patent: Oct. 6, 1998

[54] LENS COVER THAT SLIDES ALONG FRONT SURFACE OF A CAMERA BODY

[75] Inventor: Hidetaka Yokota, Tokyo, Japan

[73] Assignee: Asahi Kogaku Kabushiki Kaisha, Tokyo, Japan

[21] Appl. No.: 784,920

[22] Filed: Jan. 16, 1997

[30] Foreign Application Priority Data

Jan. 22, 1996 [JP] Japan .................................... 8-008633

[51] Int. Cl.⁶ ................................................ G03B 17/04
[52] U.S. Cl. ........................................ 396/349; 396/448
[58] Field of Search .................................. 396/348, 349, 396/439, 448, 534, 535

[56] References Cited

U.S. PATENT DOCUMENTS 4,522,478  6/1985  Kando et al. ............................. 396/448
5,594,523  1/1997  Fujisaki .................................... 396/448
5,608,478  3/1997  Kamoda .............................. 396/448 X Primary Examiner—Safet Metjahic
Assistant Examiner—J. K. Han
Attorney, Agent, or Firm—Greenblum & Bernstein, P.L.C.

[57] ABSTRACT

A camera having a sliding cover supported to slide along a front surface of a camera body to selectively cover and uncover a photographing lens. The sliding cover has at least two sliding cover elements which are slidable along the front surface of the camera body. The sliding cover has a main cover element that slides along the front surface of the camera body, and an auxiliary cover element provided between the main cover element and the front surface of the camera body. The auxiliary cover element is moved in association with a movement of the main cover element in an opening direction and a closing direction to respectively increase and reduce an amount of overlap between the main cover element and the auxiliary cover element.

11 Claims, 5 Drawing Sheets

LENS COVER THAT SLIDES ALONG FRONT SURFACE OF A CAMERA BODY

BACKGROUND OF THE INVENTION

1. Field of the Invention

The present invention relates to a camera having a sliding cover which is slidable along a front surface of a camera body.

2. Description of the Related Art

In conventional cameras, a single sliding cover is provided to slide along a front surface of the camera body in a longitudinal direction, so that when the sliding cover is manually slid to selectively cover or uncover a photographing lens, the photographing lens is located in an inoperative position in which no picture can be taken or in an operative position in which a picture can be taken.

Generally, in such conventional cameras, when the sliding cover is closed, not only the photographing lens but also an object window of a view finder (finder object window), an AF object distance measuring window, or an AE photometering window, etc., provided on the front surface of the camera body, are protected (covered) by the sliding cover. Consequently, upon photographing, the sliding cover must be moved to open or uncover the photographing lens, the finder object window, the AF object distance measuring window, and the AE photometering window, on the front surface of the camera body.

To miniaturize the camera, it is necessary to make the sliding cover small. In particular, to reduce the longitudinal size of the camera, the sliding (shifting) amount of the sliding cover must be reduced. However, if the sliding cover is too small, it is impossible for the sliding cover to cover the photographing lens, the finder object window, the AF object distance measuring window, and the AE photometering window, when closed. Moreover, if the sliding amount of the sliding cover is too small, it is impossible to completely uncover the photographing lens, the finder object window, the AF object distance measuring window, and the AE photometering window, on the front surface of the camera body, when the sliding cover is opened. Under these conditions, there has been a limitation to the amount by which the camera can be miniaturized due to the restriction of the size and displacement of the sliding cover.

SUMMARY OF THE INVENTION

It is an object of the present invention to provide a camera having a sliding cover, in which the photographing lens and other windows- such as the finder object window, the AF object distance measuring window and the AE photometering window can be completely covered or protected by the sliding cover and can be completely uncovered from the sliding cover when the sliding cover is closed and opened, respectively, even in a relatively small camera.

To achieve the object mentioned above, according to an aspect of the present invention, there is provided a camera having a sliding cover which is supported to slide along a front surface of a camera body to selectively cover or uncover at least a photographing lens. The sliding cover consists of at least two sliding cover elements which are slidable along the front surface of the camera body.

According to another aspect of the present invention, there is provided a camera having a sliding cover which is movable between a lens covering position in which at least a photographing lens is covered by the sliding cover and a lens uncovering position in which the photographing lens is uncovered. The sliding cover consists of a plurality of sliding cover elements which are relatively movable to vary the amount of overlap therebetween. The amount of overlap between the sliding cover elements is at a minimum in the lens covering position and is at a maximum in the lens uncovering position so as to minimize the displacement of the sliding cover.

According to a further aspect of the present invention, there is provided a camera having a lens protecting cover structure, having a main cover element which is guided to slide along the front surface of a camera body to selectively open or close a photographing lens of the camera. An abutment surface is provided on the front surface of the camera body to restrict the movement of the main cover element in the closing direction thereof. An non-contact end surface is provided at one end of the main cover element to form a space between the abutment surface and the non-contact end surface. An auxiliary cover element is provided between the main cover element and the front surface of the camera body to close the space when the main cover is in the closed position.

The present disclosure relates to subject matter contained in Japanese Patent Application No. 8-8633 (filed on Jan. 22, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
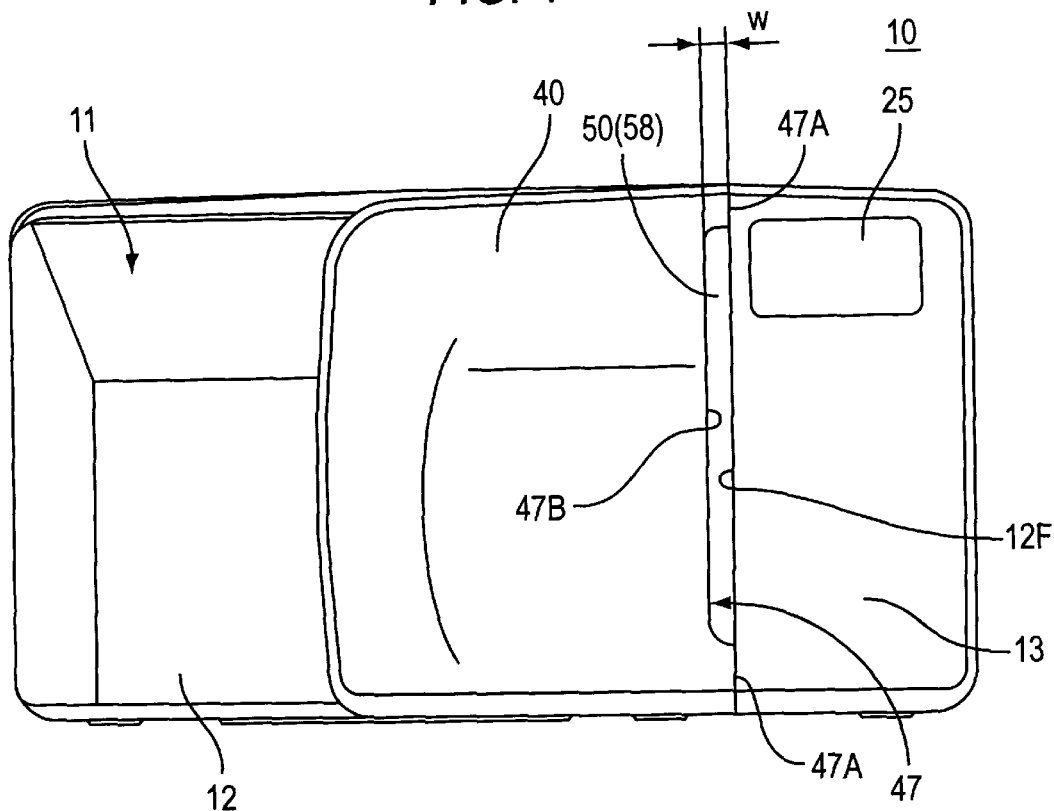
FIG. 1 is a front elevational view of a camera when a sliding cover is closed, according to the present invention.
Figure 2:
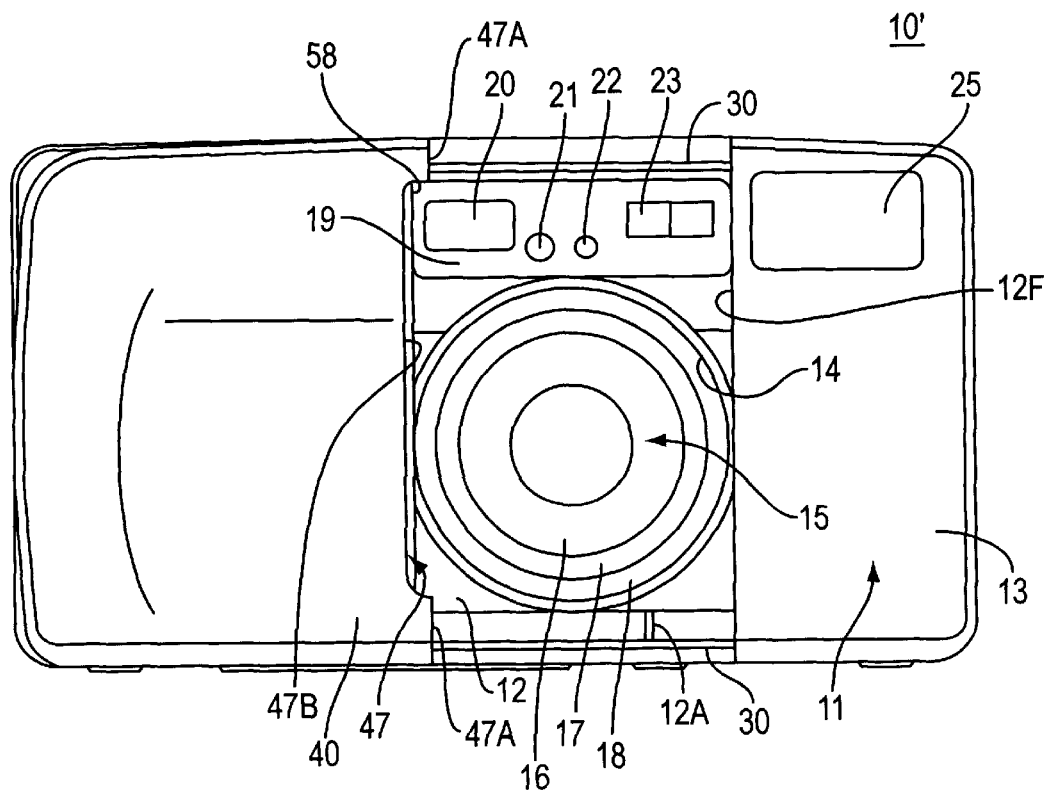
FIG. 2 is a front elevational view of a camera when a sliding cover is opened, according to the present invention.

FIGS. 1 and 2 show an embodiment of a camera (camera body) 10 to which the present invention is applied. The camera 10 is a lens shutter type of AF/AE zoom compact camera and has a main sliding cover 40 which is slidable in a longitudinal direction along a front surface of a body of the camera 10. FIG. 1 shows a non-photographing position or inoperative position (closed position) of the main sliding cover 40 when closed. FIG. 2 shows a photographing position or operative position (open position) of the main sliding cover 40 when opened.

A front body wall 11 of the camera 10 is provided with a first front surface 12 on and along which the main sliding cover 40 slides, and a second front surface 13 which is located in front of the first front surface 12 by a predetermined amount.

A photographing lens opening 14 is formed on the portion of the first front surface 12 close to the second front surface 13, so that a photographing lens 15 can be retracted or advanced into or from the opening 14.

The photographing lens 15 of the camera body 10 is provided with a three-step feed type zoom lens (variable focal length lens) barrel having first, second and third movable lens barrels 16, 17 and 18 arranged concentric to each other. The movable lens barrels 16, 17 and 18 are moved through and in the photographing lens opening 14.

Figure 3:
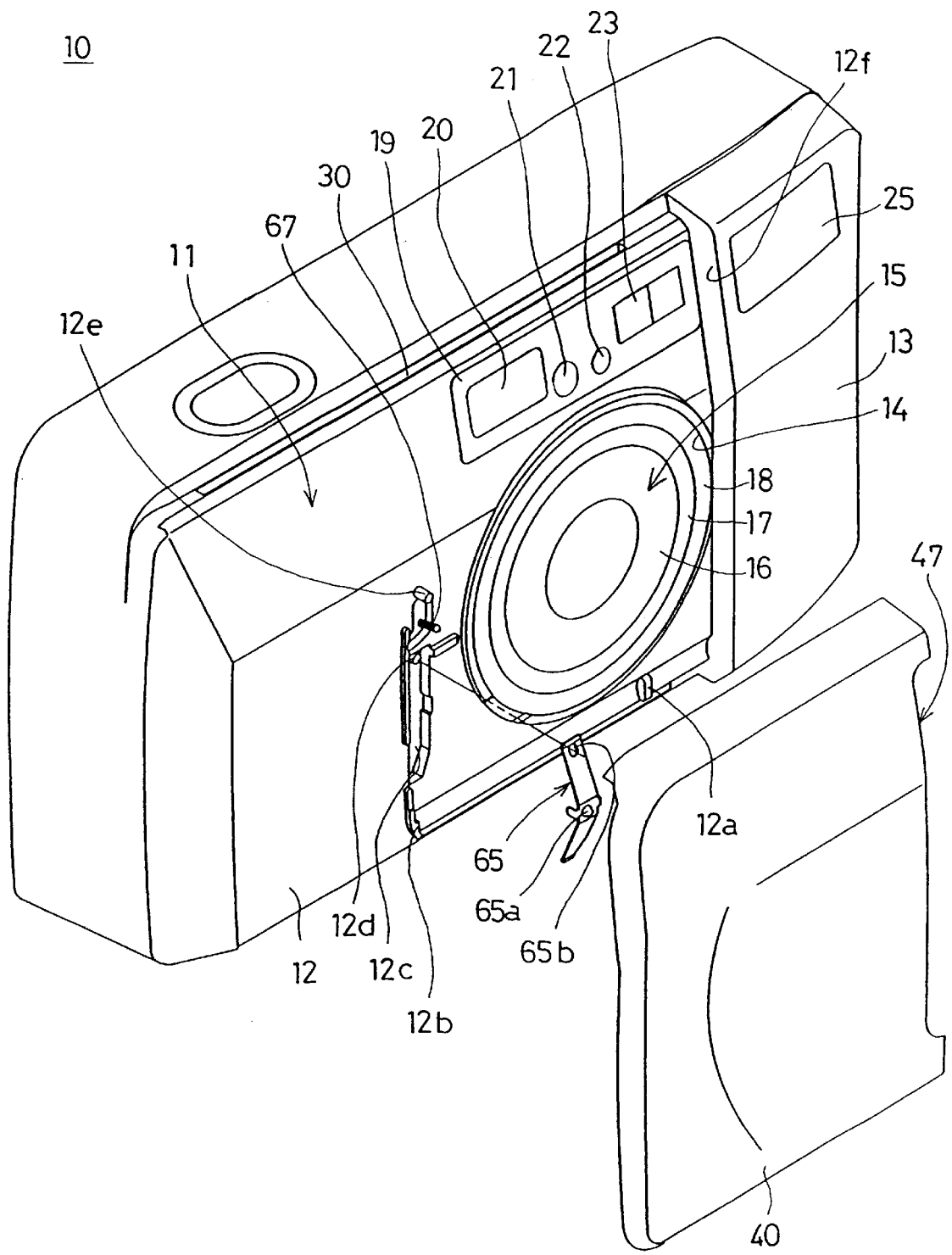
FIG. 3 is an exploded perspective view of the camera shown in FIG. 1 with the sliding cover removed.

FIG. 3 shows a retracted position of the photographing lens 15 of the camera 10. In the retracted position, the front end surfaces of the first, second and third movable lens barrels 16, 17 and 18 lie in substantially the same plane. When the main sliding cover 40 is moved to an open position as shown in FIG. 2, the photographing lens 15 is advanced slightly to move the inner photographing optical system of the photographing lens 15 to a wide angle position (WIDE) and is then telescopically moved in accordance with an operation of a zoom operation switch (not shown) provided on an upper portion of a rear surface of the camera 10 to vary the focal length between the wide angle position (WIDE) and a telephoto position (TELE).

The first front surface 12 of the camera 10 above the photographing lens 15 is provided with a longitudinally elongated (rectangular) window portion 19. The window portion 19 includes a finder object window 20, an AE photometering window 21, a self-timer lamp 22 which indicates that a self-timer is in an operative position, and an AF object distance measuring window 23, arranged in this order from the left side as viewed in FIG. 2. A strobe window 25 is provided on an upper portion of the second front surface 13.

The camera body 10 is provided with upper and lower guide grooves 30 which extend longitudinally along upper and lower edges of the first front surface 12 of the camera body 10. Guide rails 32 (see FIG. 4) which are provided on upper and lower ends of the inner surface of the main slide cover 40 are slidably fitted in the guide grooves 30. Namely, the main slide cover 40 is slidable in the longitudinal direction through the upper and lower guide grooves 30 and the corresponding upper and lower guide rails 32.

An auxiliary slide cover (sub-slide cover) 50 is provided on the inner side of the main slide cover 40 so as to move relative to the main slide cover 40 in association with the slide movement of the main slide cover 40. Thus, the slide cover of the camera 10 consists of the overlapped main and sub-slide covers 40 and 50. One of the most significant features of the present embodiment is that the slide cover consists of two or more slide cover elements, i.e., the main slide cover (element) 40 and the sub-slide cover (element) 50.

The main slide cover 40 is provided on one end 47 thereof adjacent to the second front surface 13, with abutment end surfaces 47a provided on upper and lower extremities of the end 47, and a non-contact surface 47b. The non-contact surface 47b is spaced from the ends of the abutment end surfaces 47a by a predetermined distance W in the left direction in a front elevational view of the camera 10 (FIG. 1). The camera 10 is provided on the front surface thereof with an abutment surface 12f which connects the first front surface 12 and the second front surface 13. The abutment surface 12f extends in a vertical direction of the camera 10 and in a plane parallel to an optical axis of the lens 15.

When the main slide cover 40 is closed, the upper and lower abutment surfaces 47a come into contact with the abutment surface 12f, but the non-contact end surface 47b is spaced from the abutment surface 12f by the predetermined distance W. Consequently, when the main slide cover 40 is closed, there is a space between the non-contact end surface 47b and the abutment surface 12f. The non-contact end surface 47b is formed such that the front surface of the photographing lens 15 and the window portion 19 of the camera 10 are fully opened (uncovered) when the main slide cover 40 is in an open position, as shown in FIG. 2. In other words, the end 47 (non-contact end surface 47b) never covers a part of the photographing lens 15 and the window portion 19 when the main slide cover 40 is in the open position.

The space produced between the non-contact end surface 47b and the abutment surface 12f when the main slide cover 40 is closed is covered by the end surface 58 of the sub-slide cover 50 opposed to the abutment surface 12f. Namely, the size of the main slide cover 40 is not sufficient to completely cover the photographing lens 15 and the window portion 19 of the camera 10, so that a predetermined space is produced between the non-contact end surface 47b and the abutment surface 12f, even when the main slide cover 40 is closed. Consequently, the photographing lens 15 and the window portion 19 are partly exposed through the space. However, the space is covered by the end surface 58 of the sub-slide cover 50. Thus, the end portion of the photographing lens 15 and the window portion 19, opposed to the space are covered by the sub-slide cover 50 without being exposed from the front of the camera 10.

Figure 4:
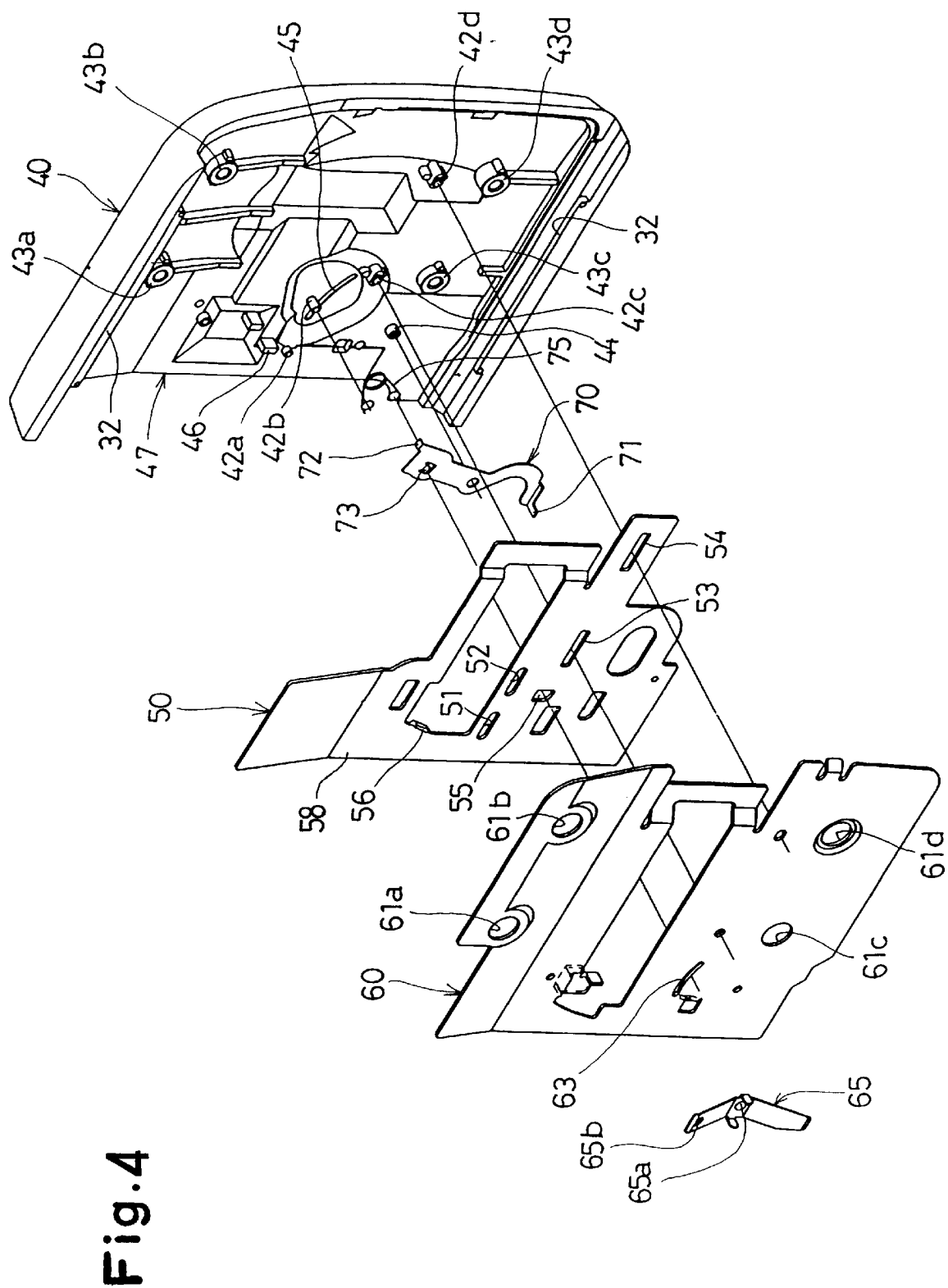
FIG. 4 is an exploded perspective view of a sliding cover.
Figure 5:
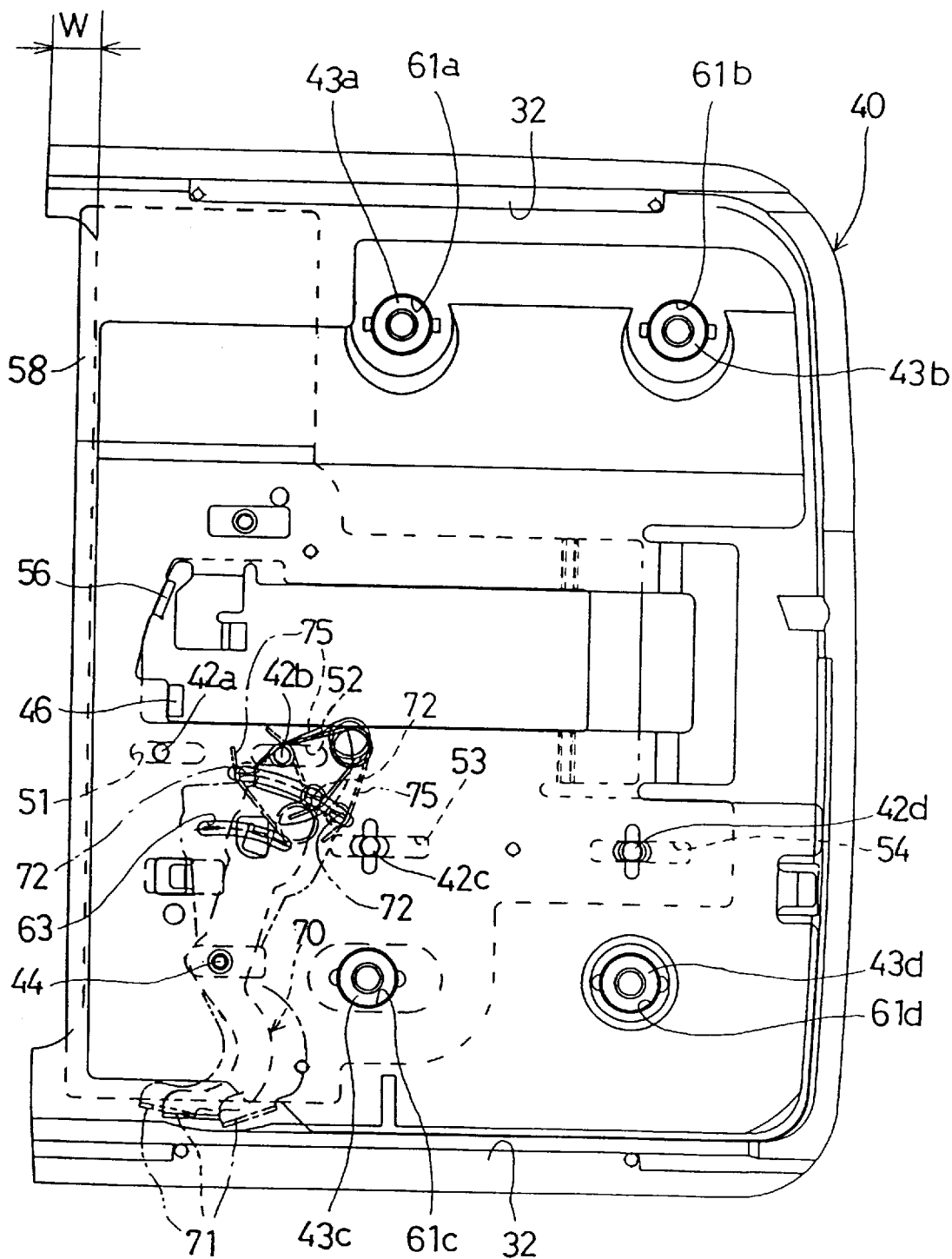
FIG. 5 is a plan view of a sliding cover as viewed from the inside thereof.
Figure 6:
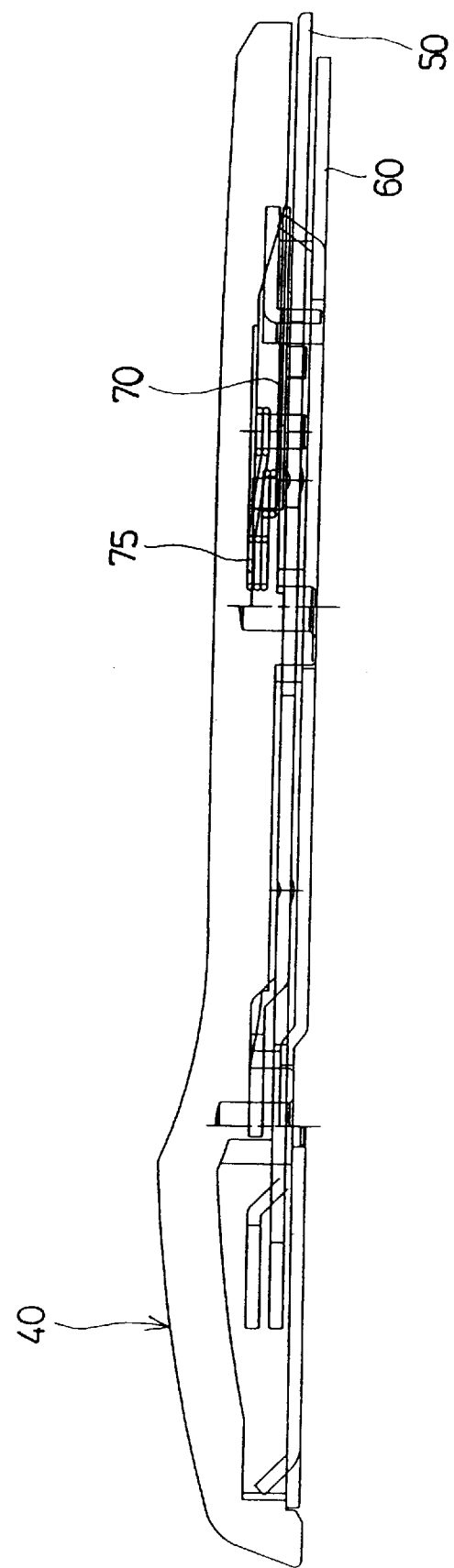
FIG. 6 is a bottom view of a sliding cover.

FIG. 4 shows an exploded perspective view of the main slide cover 40, the sub-slide cover 50 provided on the inner side of the main slide cover 40, and the members surrounding the same. FIG. 5 shows an inner end view of the main slide cover 40.

The longitudinal section of the main slide cover 40 is slightly U-shaped (curved) and is provided with the longitudinally extending upper and lower guide rails 32 on the inner surface thereof. The sub-slide cover 50, whose shape is shown in FIGS. 4 and 5, is provided on the inner side of the main slide cover 40, so that the sub-slide cover 50 is slidable in a longitudinal direction with respect to the main slide cover 40. The sub-slide cover 50 is provided with a plurality of longitudinally elongated guide holes 51, 52, 53 and 54 in which corresponding guide pins 42a, 42b, 42c and 42d provided on the main slide cover 40 are inserted, so that the sub-slide cover 50 is guided to slide in the longitudinal direction with respect to the main slide cover 40.

The main slide cover 40 is provided with a receptacle plate 60 secured thereto by means of a plurality of screws (not shown). The sub-slide cover 50 is held between the main slide cover 40 and the receptacle plate 60. The screws are screwed in corresponding threaded holes 43a, 43b, 43c and 43d formed in the inner surface of the main slide cover 40 through corresponding insertion holes 61a, 61b, 61c and 61d of the receptacle plate 60. Thus, the sub-slide cover 50 is prevented from being disengaged from the main slide cover 40 by the receptacle plate 60.

A drive lever 70 is provided between the main slide cover 40 and the sub-slide cover 50. The drive lever 70 is rotatably attached at a substantially central portion thereof to the main slide cover 40 by a shaft 44 provided on the inner surface of the main slide cover 40. The drive lever 70 is provided on a lower end thereof with an engaging leg 71 which extends in a rearward direction of the camera body 10, and on an upper end thereof with a first projection 72 which extends in a forward direction of the camera body 10 and a second projection 73 which extends through the engaging hole 55 formed in the sub-slide cover 50 in the rearward direction of the camera body 10. The engaging leg 71 can be selectively engaged with first and second drive ribs (drivers) 12a and 12b that are formed on the lower end of the first front surface 12 and are spaced from one another by a predetermined distance in the longitudinal direction.

When a rotation of the drive lever 70 about the shaft 44 takes place, the first projection 72 is guided by a curved guide groove 45 formed in the inner surface of the main slide cover 40, and the second projection 73 is guided by a curved guide groove 63 formed in the receptacle plate 60 through the engaging hole 55. With this arrangement, the rotation of the drive lever 70 causes the second projection 73 to press the inner surface of the engaging hole 55 to thereby slide the sub-slide cover 50 in the longitudinal direction.

A torsion spring 75, provided between the main slide cover 40 and the sub-slide cover 50, engages at one end with the first projection 72 and at the other end with the guide pin 42a provided on the inner surface of the main slide cover 40. A generally V-shaped click spring 65 is provided between the receptacle plate 60 and the first front surface 12 of the camera 10. The click spring 65 is provided with a central convex portion (projecting portion) 65a protruding in the forward direction of the camera 10. The portion 65a abuts against the receptacle plate 60. The first front surface 12 is provided with a recessed spring seat 12c which receives the click spring 65. The recessed spring seat 12c is provided on an upper end thereof with a small projection 12d. The upper and lower ends of the click spring 65 abut against the recessed seat 12c while the small projection 12d is engaged in a hole 65b formed in the upper end of the click spring 65. Thus, the receptacle plate 60 is subjected to a frictional force by the click spring 65, regardless of the position of the main slide cover 40. Consequently, the slide movement of the main slide cover 40 is effected against the frictional force by the click spring 65.

An operation projection 46 (FIGS. 4 and 5) which is provided on the inner surface of the main slide cover 40 projects in the rearward direction of the camera 10. The operation projection 46 is engageable with a main switch pin 67 (FIG.3) projecting from the first front surface 12 of the camera 10 in the forward direction. The main switch pin 67 is movable within a predetermined limit in the longitudinal direction of the camera 10 and is continuously biased by a biasing means (not shown) in the right direction of the camera as viewed in FIG. 3. When the main switch pin 67 is moved to the left end position (left end as viewed in FIG. 3) against the biasing means, the power source of the camera 10 is turned ON. Conversely, when the main switch pin 67 is slightly moved (for example, by approximately 1 mm) in the right direction from the left end position, the power source of the camera is turned OFF. An engaging leg 12e is provided on the first front surface 12 of the camera 10 above and near the main switch pin 67. The engaging leg 12e projects in the forward direction of the camera 10. The engaging leg 12e engages with an engaging leg 56 provided on the sub-slide cover 50 when the cover 50 is moved to a predetermined position.

The camera 10 having the construction as described above operates as follows:

In FIG. 1 in which the main slide cover 40 is completely closed, the drive lever 70 is located in a position indicated by a dotted and dashed line in FIG. 5, in which the engaging leg 71 of the drive lever 70 engages with the first drive rib 12a. In this state, the sub-slide cover 50 covers the space W defined between the non-contact end surface 47b and the abutment surface 12f, while the end surface 58 of the sub-slide cover 50 adjacent to the end 47 of the main slide cover 40 abuts against the abutment surface 12f. In this closed position, the amount of overlap between the main slide cover 40 and the sub-slide cover 50 is minimum. Also, in the closed position, the torsion spring 75 is located in a position indicated by a dotted and dashed line in FIG. 5, so that the drive lever 70 is biased in a counterclockwise direction by the torsion spring 75. Consequently, the end surface 58 of the sub-slide cover 50 is elastically brought into contact with the abutment surface 12f by the biasing force of the torsion spring 75.

In the position shown in FIG. 1, if the main slide cover 40 is manually slid to open, the engaging leg 71 of the drive lever 70 is disengaged from the first drive rib 12a, and then the engaging leg 71 abuts against the second drive rib 12b immediately before the main slide cover 40 is completely opened. Further movement of the main slide cover 40 in the opening direction (in the left direction in FIGS. 1 and 2) causes the drive lever 70 to rotate in the clockwise direction in FIG. 5. Consequently, the torsion spring 75 is moved beyond the dead center from the position indicated by a dotted and dashed line in FIG. 5 to a position indicated by a dotted line in FIG. 5. In the position indicated by a dotted and dashed line in FIG. 5, the torsion spring 75 is free. As a result of the rotation of the drive lever 70 in the clockwise direction mentioned above, the sub-slide cover 50 is moved by a predetermined amount in a retraction direction to retract the sub-slide cover 50 into the main slide cover 40, i.e., in the left direction in FIG. 2 (right direction in FIG. 5) through the second engaging leg 73 and the engaging hole 55.

When a further movement of the main slide cover 40 in the opening direction is made, the engaging leg 71 is moved in the left direction in FIG. 5 by the second drive rib 12b, so that the drive lever 70 is rotated in the clockwise direction in FIG. 5. Consequently, the sub-slide cover 50 is further retracted into the main slide cover 40 to a most retracted position (FIG. 2). In this open position, the amount of overlap between the main slide cover 40 and the sub-slide cover 50 is at a maximum. In the open position, the drive lever 70 and the torsion spring 75 are located in the respective positions indicated by the two-dotted and dashed lines in FIG. 5. The movement of the main slide cover 40 to the most retracted position causes the operation projection 46 on the inner surface of the main slide cover 40 to abut against the main switch pin 67 to move the pin 67 to the left end position as viewed from a front elevational view to thereby turn the power source of the camera 10 ON. In the open position of the main slide cover 40, the engaging projection 56 of the sub-slide cover 50 abuts against the engaging leg 12e of the first front surface 12 to prevent a further movement of the sub-slide cover 50 into the main slide cover 40. Namely, in the open position of the main slide cover 40, the engaging leg 12e determines the position of the sub-slide cover 50 in the main slide cover 40. Also, when in the open position, the main slide cover 40 is stably held in the position shown in FIG. 2 due to the frictional force by the click spring 65 so long as no external force is applied. When the power source of the camera 10 is turned ON, the photographing lens 15 is slightly advanced so that a picture can be taken, as mentioned above.

The manual movement of the main slide cover 40 from the open position shown in FIG. 2 to a closed position will be discussed below. When the main slide cover 40 is slightly (for example, approximately 1 mm) moved in the closing direction (right direction in FIGS. 1 and 2), the operation projection 46 is disengaged from the main switch pin 67 to turn the power source of the camera 10 OFF. Consequently, the photographing lens 15 is retracted as shown in FIG. 3. Also, the engaging leg 71 is disengaged from the second drive rib 12b, so that the drive lever 70 is rotated in the counterclockwise direction in FIG. 5 by the biasing force of the torsion spring 75. Consequently, the slight movement of the sub-slide cover 50 toward the closed position occurs.

When a further movement of the main slide cover 40 is made to close the same, the engaging leg 71 comes into contact with the first drive rib 12a immediately before the main slide cover 40 is completely closed. If the main slide cover 40 is further moved to a completely closed position, the drive lever 70 is rotated in the counterclockwise direction in FIG. 5, so that the sub-slide cover 50 is moved in the closing direction to abut against the abutment surface 12f. Namely, the sub-slide cover 50 is moved beyond the dead center of the torsion spring 75 from the position indicated by a dotted line in FIG. 5 to the position indicated by a dotted and dashed line in FIG. 5. Consequently, the end surface 58 of the sub-slide cover 50 abuts against the abutment surface 12f due to the biasing force. Thus, the front surface of the photographing lens 15 and the window portion 19 of the camera 10 are entirely covered by the main slide cover 40 and the sub-slide cover 50.

As mentioned above, according to the present embodiment, since the slide cover consists of two cover elements, i.e., the main slide cover (element) 40 and the sub-slide cover (element) 50, the photographing lens 15 and the window portion 19 of the camera can be wholly covered when the slide cover is closed, and can be entirely uncovered when the slide cover is in an open position, despite the fact that the size and displacement of the slide cover are considerably small.

Although the above discussion has been directed to a camera including a photographing lens 15 having a three-step feed type zoom lens barrel, the present invention is not limited thereto. Namely, the present invention can be equally applied to a camera having a photographing lens with a one-step feed type, a two-step feed type or more than three-step feed type zoom lens, or a single focal length type photographing lens having no feedable lens barrel.

Although the slide cover of the camera 10 consists of two slide cover elements, i.e., the main slide cover 40 and the sub-slide cover 50 in the illustrated embodiment, the present invention is not limited thereto. For instance, it is possible to provide two or more slide cover elements on the inner side of the main slide cover 40. Namely, the number of slide cover elements can be more than two.

Furthermore, although the drive means for rotating the drive lever 70 consists of the first drive rib 12a and the second drive rib 12b provided on the first front surface 12 of the camera body in the illustrated embodiment, the present invention is not limited to this arrangement. The drive ribs can be replaced with other members provided on the first front surface 12.

In addition, although the finder object window 20, the AE photometering window 21, the self-timer lamp 22 and the AF object distance measuring window 23, are provided in the window portion 19 of the camera body 10 in the above-mentioned embodiment, the present invention is not limited to this embodiment. Windows for other optical elements, photometering elements, light emitters, etc., can be provided in the window portion.

As can be understood from the foregoing, according to the present invention, since the slide cover consists of at least two slide cover elements which are slidable along the front surface of the camera body, not only the photographing lens but also the various windows such as the finder object window, the AF object distance measuring window, the AE photometering window, etc., can be covered and protected by the slide cover when the slide cover of a compact camera is closed. Moreover, when the slide cover is opened, the photographing lens and the windows can be uncovered from the slide cover and exposed from the front surface of the camera.

What is claimed is:

1. A camera having a sliding cover supported to slide along a front surface of a camera body to one of selectively cover and uncover a photographing lens, said sliding cover comprising at least two sliding cover elements which are slidable along the front surface of the camera body, wherein said sliding cover comprises a main cover element guided to slide along the front surface of the camera body, and an auxiliary cover element provided between the main cover element and the front surface of the camera body, said auxiliary cover element being moved in association with a movement of said main cover element in an opening direction and a closing direction to respectively increase and reduce an amount of overlap between said main cover element and said auxiliary cover element, the camera further comprising a drive lever that moves said auxiliary cover element relative to said main cover element in a same direction as said main cover element, in association with a movement of said main cover element, said drive lever being pivoted to said main cover element, one end of said drive lever engaging with said auxiliary cover element, another end of said drive lever engaging with a driving portion provided on the front surface of the camera body.

2. A camera having a sliding cover according to claim 1, wherein said driving portion comprises a pair of spaced drive ribs provided on and projecting from the front surface of the camera body.

3. A camera having a sliding cover according to claim 1, wherein the auxiliary cover element is provided with an auxiliary cover end which extends from an end of the main cover element in said closing direction to expose the front surface of the camera body when the main cover element is closed to close said sliding cover.

4. A camera having a sliding cover according to claim 1, further comprising a positioning member that determines a position of the auxiliary cover element, relative to the front surface of the camera body when said sliding cover is opened.

5. A camera having a sliding cover according to claim 4, wherein said positioning member comprises engaging projections provided on the front surface of the camera body to engage with a part of the auxiliary cover element.

6. A camera having a sliding cover movable between a lens covering position, in which a photographing lens is covered by said sliding cover, and a lens uncovering position, in which said photographing lens is uncovered, wherein said sliding cover comprises a plurality of sliding cover elements relatively movable to vary an amount of overlap therebetween, said amount of overlap between said sliding cover elements being at a minimum at said lens covering position and being at a maximum at said lens uncovering position, so as to minimize a moving amount of said sliding cover, the camera further comprising a drive lever that moves one of said plurality of sliding cover elements relative to another of said plurality of sliding cover elements in a same direction as said another of said plurality of sliding cover elements, in association with a movement of said another of said plurality of sliding cover elements, said drive lever being pivoted to said another of said plurality of sliding cover elements, one end of said drive lever engaging with said one of said plurality of sliding cover elements, another end of said drive lever engaging with a driving portion provided on the front surface of the camera body.

7. A camera having a lens protecting cover structure, comprising:
a main cover element guided to slide along a front surface of a camera body to one of selectively open and close a photographing lens of said camera;

an abutment surface provided on said front surface of said camera body to restrict a movement of said main cover element in a closing direction thereof;

a non-contact end surface provided at one end of said main cover element which forms a space between said abutment surface and said non-contact end surface; and an auxiliary cover element provided between said main cover element and said front surface of said camera body to close said space when said main cover is in a closed position.

8. A camera according to claim 7, further comprising a driving mechanism for moving said auxiliary cover element to retract and protrude from said non-contact surface of said main cover element in association with a movement of said main cover element in said opening and closing directions.

9. A camera according to claim 8, further comprising a driving mechanism for moving said auxiliary cover element relative to said main cover element in a same direction as that of said main cover element in association with said movement of said main cover element.

10. A camera according to claim 9, said driving mechanism comprising a drive lever pivoted to said main cover element, one end of said drive lever engaging with said auxiliary cover element, another end of said drive lever engaging with a driving portion provided on said front surface of said camera body.

11. A camera having a sliding cover according to claim 10, wherein said driving portion comprises a pair of spaced drive ribs provided on and projecting from said front surface of said camera body.

* * * * *

UNITED STATES PATENT AND TRADEMARK OFFICE
CERTIFICATE OF CORRECTION

PATENT NO. : 5,819,127
DATED : October 6, 1998
INVENTOR(S) : H. YOKOTA

It is certified that error appears in the above-identified patent and that said Letters Patent is hereby corrected as shown below:

On the cover page of the printed patent, item [73] Assignee, line 1 change "Asahi Kogaku Kabushiki Kaisha" to ---Asahi Kogaku Kogyo Kabushiki Kaisha---.

Signed and Sealed this

Eleventh Day of May, 1999

*Attest:*

Q. TODD DICKINSON

*Attesting Officer*      *Acting Commissioner of Patents and Trademarks*